(12) United States Patent
Alfakih et al.

(10) Patent No.: US 7,646,706 B2
(45) Date of Patent: Jan. 12, 2010

(54) RESTORATION TIME IN MESH NETWORKS

(75) Inventors: Abdo Y. Alfakih, Windsor (CA); Gary W. Atkinson, Freehold, NJ (US); Carol L. Janczewski, Freehold, NJ (US); Kamala Murti, Morganville, NJ (US); Ramesh Nagarajan, Somerset, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1136 days.

(21) Appl. No.: 10/673,056

(22) Filed: Sep. 26, 2003

(65) Prior Publication Data

US 2004/0190441 A1 Sep. 30, 2004

Related U.S. Application Data

(60) Provisional application No. 60/459,163, filed on Mar. 31, 2003.

(51) Int. Cl.
*G01R 31/08* (2006.01)
*H04L 12/26* (2006.01)
(52) U.S. Cl. ............... 370/217; 370/221; 370/225; 370/406; 709/239
(58) Field of Classification Search ............ 370/406, 370/225, 244, 217, 216, 237, 228, 248, 224, 370/221; 709/239, 251
See application file for complete search history.

(56) References Cited

U.S. PATENT DOCUMENTS 4,190,821 A 2/1980 Woodward ............... 714/4
(Continued)

OTHER PUBLICATIONS

Availability analysis of span-restorable mesh networks; M Clouqueur, WD Grover—IEEE Journal on Selected Areas in Communications, 2002.*

(Continued)

*Primary Examiner*—Ayaz R Sheikh
*Assistant Examiner*—Salman Ahmed
(74) *Attorney, Agent, or Firm*—Mendelsohn, Drucker & Associates, P.C.; Steve Mendelsohn

(57) ABSTRACT

A restoration path planner that minimizes the worst-case number of cross-connections that must be performed in a network in the event of a single element failure involves a two-phase optimization. The first phase involves finding two node-disjoint paths for each service demand within a network such that the maximum link bandwidth in the network is minimized and the link bandwidths within the network are leveled. The second phase involves identifying the primary and restoration paths for each service demand within the network such that the worst-case number of cross-connections at any node within the network is minimized across all possible single-event failures. Embodiments also consider service demand-bundling that groups service demands with the same source-destination node pairs and routes them along identical primary and restoration paths, and banding, which consolidates multiple low-rate demands into a high-rate demand and consequently decreases cross-connections required in the event of a failure.

26 Claims, 4 Drawing Sheets

U.S. PATENT DOCUMENTS

| | | | |
|---|---|---|---|
| 4,594,709 A | 6/1986 | Yasue | 714/4 |
| 4,797,882 A | 1/1989 | Maxemchuk | 370/94 |
| 5,365,518 A * | 11/1994 | Noser | 370/535 |
| 5,452,286 A * | 9/1995 | Kitayama | 370/228 |
| 5,506,956 A | 4/1996 | Cohen | 395/182.04 |
| 5,706,276 A * | 1/1998 | Arslan et al. | 370/216 |
| 5,754,543 A | 5/1998 | Seid | 370/351 |
| 5,854,903 A | 12/1998 | Morrison et al. | 395/200.79 |
| 5,856,981 A | 1/1999 | Voelker | 371/20.1 |
| 5,881,048 A * | 3/1999 | Croslin | 370/228 |
| 5,933,422 A | 8/1999 | Kusano et al. | 370/331 |
| 5,933,425 A | 8/1999 | Iwata | 370/351 |
| 5,956,339 A | 9/1999 | Harada et al. | 370/400 |
| 5,995,485 A * | 11/1999 | Croslin | 370/216 |
| 6,075,766 A * | 6/2000 | Croslin | 370/225 |
| 6,097,696 A * | 8/2000 | Doverspike | 370/216 |
| 6,104,701 A | 8/2000 | Avargues et al. | 370/238 |
| 6,130,875 A | 10/2000 | Doshi et al. | 370/225 |
| 6,141,319 A | 10/2000 | Dighe et al. | 370/218 |
| 6,205,117 B1 | 3/2001 | Doshi et al. | 370/228 |
| 6,282,170 B1 | 8/2001 | Bentall et al. | 370/225 |
| 6,477,582 B1 | 11/2002 | Luo et al. | 709/241 |
| 6,512,740 B1 * | 1/2003 | Baniewicz et al. | 370/216 |
| 6,538,987 B1 | 3/2003 | Cedrone et al. | 370/216 |
| 6,549,513 B1 * | 4/2003 | Chao et al. | 370/227 |
| 6,606,303 B1 | 8/2003 | Hassel et al. | 370/238 |
| 6,643,464 B1 | 11/2003 | Roorda et al. | 398/59 |
| 6,697,334 B1 | 2/2004 | Klincewicz et al. | 370/238 |
| 6,711,125 B1 | 3/2004 | Walrand et al. | 370/223 |
| 6,725,401 B1 | 4/2004 | Lindhorst-Ko | 714/47 |
| 6,744,727 B2 | 6/2004 | Liu et al. | 370/228 |
| 6,760,302 B1 | 7/2004 | Ellinas et al. | 370/228 |
| 6,778,492 B2 | 8/2004 | Charny et al. | 370/228 |
| 6,795,394 B1 | 9/2004 | Swinkels et al. | 370/222 |
| 6,807,653 B2 | 10/2004 | Saito | 716/2 |
| 6,842,723 B2 * | 1/2005 | Alicherry et al. | 703/2 |
| 6,850,487 B2 * | 2/2005 | Mukherjee et al. | 370/225 |
| 6,856,592 B2 | 2/2005 | Grover et al. | 370/216 |
| 6,863,363 B2 * | 3/2005 | Yabuta | 347/19 |
| 6,882,627 B2 | 4/2005 | Pieda et al. | 370/248 |
| 6,895,441 B1 | 5/2005 | Shabtay et al. | 709/238 |
| 6,904,462 B1 | 6/2005 | Sinha | 709/226 |
| 6,977,889 B1 * | 12/2005 | Kawaguchi et al. | 370/228 |
| 6,982,951 B2 | 1/2006 | Doverspike et al. | 370/217 |
| 6,990,068 B1 * | 1/2006 | Saleh et al. | 370/225 |
| 6,996,065 B2 | 2/2006 | Kodialam et al. | 370/238 |
| 7,009,991 B2 | 3/2006 | Shachar et al. | 370/436 |
| 7,039,009 B2 | 5/2006 | Chaudhuri et al. | 370/225 |
| 7,042,836 B2 * | 5/2006 | Isonuma et al. | 370/224 |
| 7,099,286 B1 | 8/2006 | Swallow | 370/255 |
| 7,110,356 B2 | 9/2006 | Illikkal et al. | 370/222 |
| 7,133,358 B2 | 11/2006 | Kano | 370/221 |
| 7,164,652 B2 | 1/2007 | Puppa et al. | 370/225 |
| 7,180,852 B1 | 2/2007 | Doverspike et al. | 370/217 |
| 7,188,280 B2 * | 3/2007 | Shinomiya et al. | 714/43 |
| 7,197,008 B1 | 3/2007 | Shabtay et al. | 370/218 |
| 7,209,975 B1 | 4/2007 | Zang et al. | 709/238 |
| 7,218,851 B1 | 5/2007 | Zang | 398/33 |
| 7,248,561 B2 | 7/2007 | Ishibashi et al. | 370/228 |
| 7,272,116 B1 | 9/2007 | Houchen | 370/258 |
| 7,274,869 B1 * | 9/2007 | Pan | 398/5 |
| 7,280,755 B2 | 10/2007 | Kang et al. | 398/7 |
| 7,286,489 B2 * | 10/2007 | Ades | 370/254 |
| 7,301,895 B2 * | 11/2007 | Saleh et al. | 370/218 |
| 7,308,198 B1 * | 12/2007 | Chudak et al. | 398/58 |
| 7,342,873 B1 * | 3/2008 | Nagarajan | 370/217 |
| 7,352,692 B1 * | 4/2008 | Saleh et al. | 370/216 |
| 7,362,709 B1 | 4/2008 | Hui et al. | 370/237 |
| 7,398,321 B2 | 7/2008 | Qiao et al. | 709/239 |
| 7,430,164 B2 * | 9/2008 | Bare | 370/217 |
| 7,477,657 B1 | 1/2009 | Murphy et al. | 370/468 |
| 7,502,313 B2 * | 3/2009 | Saleh et al. | 370/216 |
| 2001/0038471 A1 * | 11/2001 | Agrawal et al. | 359/110 |
| 2001/0048660 A1 * | 12/2001 | Saleh et al. | 370/216 |
| 2002/0004843 A1 | 1/2002 | Andersson et al. | 709/238 |
| 2002/0009092 A1 * | 1/2002 | Seaman et al. | 370/406 |
| 2002/0059432 A1 | 5/2002 | Masuda et al. | 709/227 |
| 2002/0067693 A1 | 6/2002 | Kodialam et al. | 370/216 |
| 2002/0071392 A1 * | 6/2002 | Grover et al. | 370/241 |
| 2002/0097671 A1 | 7/2002 | Doverspike et al. | 370/216 |
| 2002/0118636 A1 | 8/2002 | Phelps et al. | 370/222 |
| 2002/0141334 A1 | 10/2002 | Deboer et al. | 370/227 |
| 2002/0174207 A1 | 11/2002 | Battou | 709/223 |
| 2002/0181444 A1 * | 12/2002 | Acampora | 370/352 |
| 2002/0191247 A1 | 12/2002 | Lu et al. | 359/124 |
| 2002/0194339 A1 | 12/2002 | Lin et al. | 709/226 |
| 2003/0005165 A1 * | 1/2003 | Langridge et al. | 709/251 |
| 2003/0009582 A1 | 1/2003 | Qiao et al. | 709/233 |
| 2003/0016624 A1 * | 1/2003 | Bare | 370/217 |
| 2003/0018812 A1 | 1/2003 | Lakshminarayana et al. | 709/241 |
| 2003/0021222 A1 * | 1/2003 | Boer et al. | 370/216 |
| 2003/0037276 A1 | 2/2003 | Mo et al. | 714/4 |
| 2003/0048749 A1 | 3/2003 | Stamatelakis et al. | 370/225 |
| 2003/0065811 A1 | 4/2003 | Lin et al. | 709/232 |
| 2003/0095500 A1 | 5/2003 | Cao | 370/216 |
| 2003/0112760 A1 | 6/2003 | Puppa et al. | 370/241.1 |
| 2003/0117950 A1 | 6/2003 | Huang | 370/220 |
| 2003/0147352 A1 * | 8/2003 | Ishibashi et al. | 370/248 |
| 2003/0169692 A1 | 9/2003 | Stern et al. | 370/242 |
| 2003/0179750 A1 * | 9/2003 | Saleh et al. | 370/216 |
| 2003/0179701 A1 * | 9/2003 | Saleh et al. | 370/216 |
| 2003/0193944 A1 | 10/2003 | Sasagawa | 370/389 |
| 2003/0223357 A1 | 12/2003 | Lee | 370/218 |
| 2004/0004938 A1 | 1/2004 | Buddhikot et al. | 370/238 |
| 2004/0008619 A1 * | 1/2004 | Doshi et al. | 370/217 |
| 2004/0032831 A1 * | 2/2004 | Matthews | 370/238 |
| 2004/0042402 A1 | 3/2004 | Galand et al. | 370/237 |
| 2004/0052207 A1 | 3/2004 | Charny et al. | 370/216 |
| 2004/0057375 A1 | 3/2004 | Shiragaki et al. | 370/216 |
| 2004/0114512 A1 | 6/2004 | Johri | 370/225 |
| 2004/0165526 A1 | 8/2004 | Yada et al. | 370/216 |
| 2004/0174882 A1 | 9/2004 | Willis | 370/395.5 |
| 2004/0184402 A1 | 9/2004 | Alicherry et al. | 370/216 |
| 2004/0186696 A1 * | 9/2004 | Alicherry et al. | 703/1 |
| 2004/0190441 A1 * | 9/2004 | Alfakih et al. | 370/216 |
| 2004/0190445 A1 | 9/2004 | Dziong et al. | 370/225 |
| 2004/0190461 A1 | 9/2004 | Gullicksen et al. | 370/216 |
| 2004/0205239 A1 | 10/2004 | Doshi et al. | 709/241 |
| 2004/0208547 A1 | 10/2004 | Sabat et al. | 398/50 |
| 2004/0233843 A1 | 11/2004 | Barker | 370/225 |
| 2005/0036442 A1 * | 2/2005 | Saleh et al. | 370/216 |
| 2005/0185652 A1 | 8/2005 | Iwamoto | 370/395.1 |
| 2005/0201276 A1 | 9/2005 | Sinha | 370/225 |
| 2005/0232144 A1 | 10/2005 | Doverspike et al. | 370/216 |
| 2006/0013149 A1 | 1/2006 | Jahn et al. | 370/254 |
| 2006/0051090 A1 | 3/2006 | Saniee et al. | 398/59 |
| 2006/0153066 A1 * | 7/2006 | Saleh et al. | 370/216 |
| 2006/0178918 A1 | 8/2006 | Mikurak | 705/7 |
| 2007/0011284 A1 | 1/2007 | Le Roux et al. | 709/223 |
| 2007/0104120 A1 * | 5/2007 | Shah-Heydari | 370/256 |
| 2007/0189191 A1 * | 8/2007 | Ades | 370/254 |
| 2008/0095045 A1 | 4/2008 | Owens et al. | 370/220 |
| 2008/0225696 A1 * | 9/2008 | Saleh et al. | 370/216 |
| 2008/0310299 A1 * | 12/2008 | Saleh et al. | 370/221 |
| 2009/0040989 A1 * | 2/2009 | da Costa et al. | 370/338 |

OTHER PUBLICATIONS

Quantifying and managing the influence of maintenance actions on the survivability of mesh; WD Grover, M Clouqueur, T Bach—Proceedings of National Fiber Optic Engineers 2001.*
Design of a meta-mesh of chain subnetworks: enhancing theattractiveness of mesh-restorable WDM networking on low connectivitygraphs; Grover, W.D. Doucette, J. TRLabs, Edmonton, Alta.; This paper appears in: Selected Areas in communications, IEEE Journal on Publication Date: Jan. 2002; vol. 20, Issue: 1, On pp. 47-61.*

Availability analysis of span-restorable mesh networks; Clouqueur, M.; Grover, W.D.; Selected Areas in Communications, IEEE Journal on vol. 20, Issue 4, May 2002 pp. 810-821.*

"RSVP-TE: Extensions to RSVP for LSP Tunnels" by D. Awduche, L. Berger, D. Gan, T. Li, V. Srinivasan, and G. Swallow; Cisco Systems, Inc. Dec. 2001, pp. 1-55.

"Operation & Maintenance mechanism for MPLS networks"; ITU-T Recommnendation Y.1711; Telecommunication Standardization Sector of ITU; Series Y: Global Information Infrastructure And Internet Protocol Aspects; Nov. 2002.

"Optical Network Design and Restoration" by B. T. Doshi, et al., BLTJ, Jan.-Mar. 1999.

"Design of a Meta-mesh of Chain Subnetworks: Enhancing the Attractiveness of Mesh-Restorable WDM networking on Low Connectivity Graphs" by W. D. Grover and J. Doucette, IEEE JSAC, vol. 20, No. 1, Jan. 2002.

"SONET Bidirectional Line-Switched Ring Equipment Generic Criteria," Generic Requirements, GR-1230-CORE, Issue 4, Dec. 1998, pp. 3-48 through 3-61.

Cisco's Packet over SONET/SDH (POS) Technology Support; Mission Accomplished Copyright 1997. Cisco Systems, Inc. pp. 1-8.

"Operation & Maintenance mechanism for MPLS networks" ITU-T, Y.1711, 2002, pp. 1-22.

"Using Local Information for WDM Network Protection", by Hungjen Wang et al., http://www.mit.edu/~modiano/papers/C46.pdf, 2002, pp. 1-4.

"Fast, Scalable, and Distributed Restoration in General Mesh Optical Networks" by Gary P. Austin et al.; Bell Labs Technical Journal; Jan.-Jun. 2001; pp. 67-81.

"Optimal Design and Evaluation of Survivable WDM Transport Networks" by Yasuhiro Miyao et al.; IEEE Journal on Selected Areas in Communications, vol. 16, No. 7, Sep. 1998, pp. 1190-1198.

* cited by examiner

RESTORATION TIME IN MESH NETWORKS

CROSS-REFERENCE TO RELATED APPLICATIONS

This application claims the benefit of the filing date of U.S. provisional application No. 60/459,163, filed on Mar. 31, 2003.

BACKGROUND OF THE INVENTION

1. Field of the Invention

The present invention relates to communications networks and, more specifically, to restoration time improvements in (e.g., optical) mesh networks.

2. Description of the Related Art

In robust communications networks, it is typical to provide path redundancy for services. This is generally done by providing a primary path and a restoration path for each service. In the event of a failure along the primary path, the service traffic is switched over to the restoration path. Note that, in the art, the term "primary path" is often synonymous with the term "working path," while the term "restoration path" is often synonymous with the terms "protection path" and "alternative path."

For optical mesh transport networks, a challenge is to provide cost-effective systems that support restoration times that are comparable to those provided by SONET/SDH networks with self-healing rings (e.g., 10-100 ms restoration times). To help reduce network restoration time in optical mesh networks, several areas have been considered, including improving restoration signaling and associated algorithms and improving the switching speed of cross-connection infrastructure switching elements. A critical bottleneck for restoration speedup is the maximum number of cross-connections to be performed at a single network element in the event of a failure. Assuming everything else is constant, the larger the number of cross-connects, the longer the restoration time.

SUMMARY OF THE INVENTION

Problems in the prior art are addressed in accordance with principles of the present invention by a method and apparatus for restoration path planning that reduces the worst-case number of cross-connections that must be performed in a network in the event of a single element (e.g., node or link) failure within the network. Because the worst-case cross-connection time in a network is a major constituent of the overall restoration time, the reduction in the number of cross-connections yields a significant reduction in the overall restoration time for the network.

One embodiment of the invention involves a two-phase optimization. The first phase involves finding two node-disjoint paths for each service demand within a network such that the maximum link bandwidth in the network is minimized and the link bandwidths within the network are leveled. (Two paths are referred to as node-disjoint if they have no intermediate (i.e., transit) nodes in common.) The second phase involves identifying the primary and restoration paths for each service demand within the network such that the worst-case number of cross-connections at any node within the network is minimized across all possible single-event failures.

Embodiments of the present invention may also involve service-demand-bundling, which groups service demands with the same source-destination node pairs and then routes them all along identical primary and restoration disjoint paths. While signaling can be carried out jointly for the entire group, routing grouped demands is likely to be less cost-effective and also restricts traffic re-engineering options to minimize worst-case cross-connection load.

Embodiments of the present invention may also involve node-bundling, wherein cross-connection requests are grouped as they arrive at each node (up to a time limit), and/or path-bundling, wherein demands with the same restoration path are grouped together. In each case, bundles are formed at the common source node as failure notices arrive from the destination node.

In one embodiment, the present invention is a method that involves receiving one or more demands for service in a mesh network comprising a plurality of nodes interconnected by a plurality of links; and mapping each of the one or more demands onto a primary path and a restoration path in the network to generate a path plan for the one or more demands in the network, wherein reduction of a portion of restoration time associated with failure-related cross-connections in the network is taken into account during the mapping.

In another embodiment, the present invention is a network manager for a mesh network comprising a plurality of nodes interconnected by a plurality of links. The network manager is adapted to (1) receive one or more demands for service in the network; and (2) map each of the one or more demands onto a primary path and a restoration path in the network to generate a path plan for the one or more demands in the network, wherein reduction of a portion of restoration time associated with failure-related cross-connections in the network is taken into account during the mapping.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
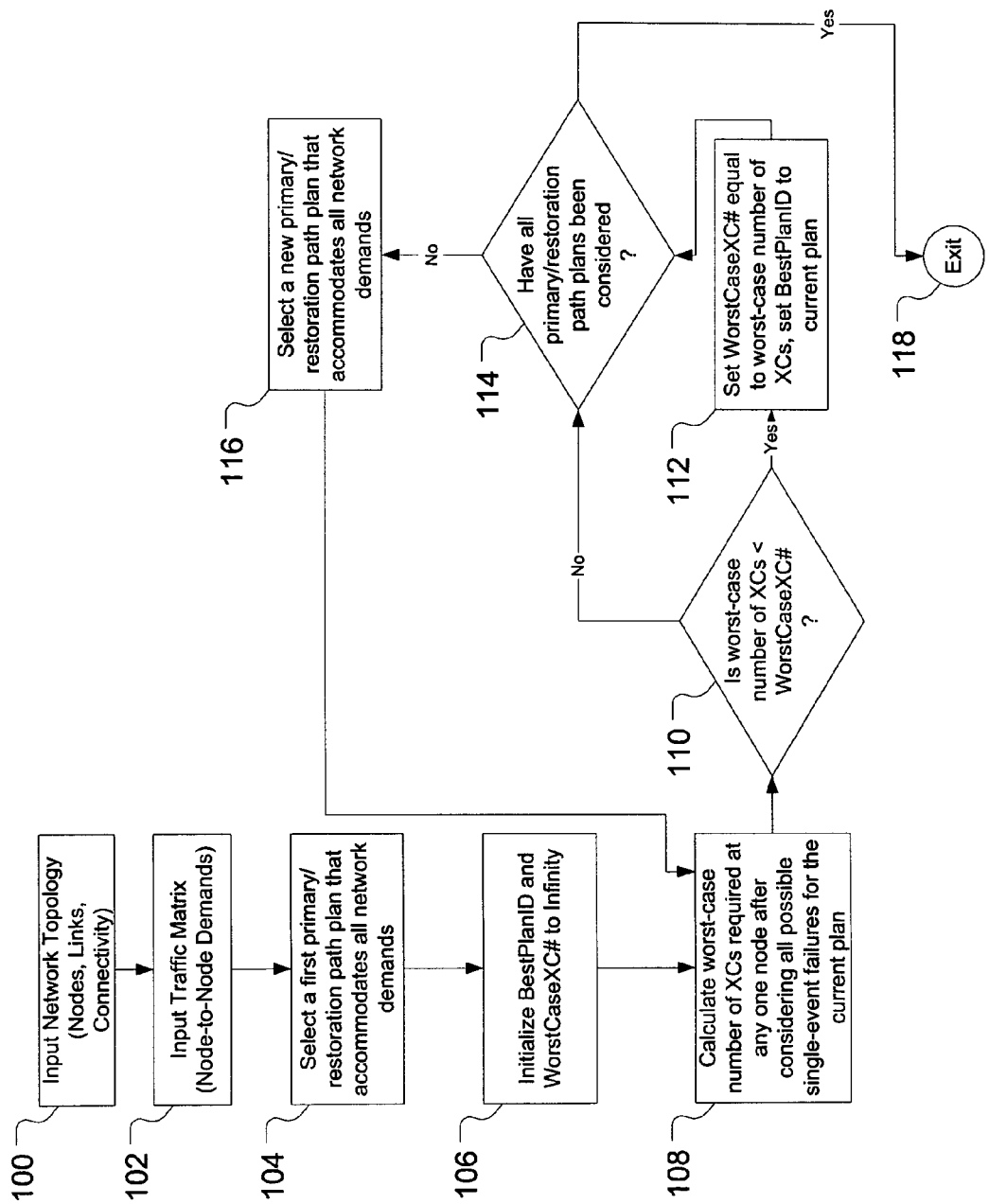
FIG. 1 illustrates a method for minimizing the number of cross-connections within a mesh network according to one embodiment of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Introduction

Significant research has been done into various restoration and protection strategies for mesh networks at both the service and optical layers. Proposed architectures include centralized vs. distributed, pre-computed vs. computed on demand in real-time, and link-based vs. path-based. Characteristics that distinguish between these various restoration and protection strategies include recovery time, failure coverage, and required recovery capacity. A survey of relevant research as well as a specific distributed recovery strategy that provides sub-second recovery times for carrier-scale mesh-based optical networks are addressed in Doshi, B. T., Dravida, S., Harshavardhana, P., Hauser, O., and Wang, Y., "Optical Network Design and Restoration," Bell Labs Technical Journal, Jan-Mar 1999 (herein "Doshi '99"), incorporated herein by reference in its entirety.

So-called "shared mesh recovery" is a known concept in optical transport networks (e.g., SONET/SDH). In this scheme, when a failure occurs, the network recovers service carried by the affected paths by using recovery capacity that has been set aside on alternative routes for this purpose. The recovery capacity can be shared over different types of single-event failure scenarios. This involves commensurate switching capability from the transport network elements (e.g., digital cross-connects).

Unless otherwise clear from the context, the process of "restoration" is synonymous in this specification with the process of "protection." In general, such process involves various associated recovery actions following the detection of a failure, including switching to an alternative (i.e., restoration) path. Depending on the implementation, such process may involve either pre-computation or real-time computation of alternative paths. Pre-computation generally exhibits shorter recovery times but may be less optimal than real-time computation, which benefits from the ability to take into account the most current state of the network demands and resources.

Restoration schemes based on sharing the protection capacity in a general mesh-type network (either wavelength or SONET/SDH) can result in significant cost savings compared to dedicated 1+1 and shared protection ring schemes.

A shared restoration scheme can be developed for mesh networks that provides protection for several different failure scenarios while requiring less network capacity than 1+1 or ring-based schemes. Also, mesh networks are more flexible than ring-based architectures and allow new network elements to be added more easily without service interruption. Such mesh-based transport networks are made possible with the advent of dynamic optical cross-connects such as the LambdaRouter™ from Lucent Technologies Inc. of Murray Hill, N.J.

One goal in these mesh-based optical transport networks is to achieve restoration times comparable to SONET/SDH ring networks. Alternatively, a network operator may have identified sub-second restoration time goals based on its own needs. For example, an operator may wish to prevent race conditions between protection mechanisms present in the service layer (ATM or IP) and those in the optical layer. This requires the optical layer restoration to be completed well before the service layer protection activates and generates unnecessary restoration activity. Also, an operator may wish to minimize the loss of revenue impact of a network failure by minimizing the time to return the network to its full revenue-generating status. With the ultra-high-capacity fiber cables and optical cross-connects available today, any cable cut or cross-connect failure would be catastrophic unless rapid service restoration were an integral part of the network design and operation strategy. Additionally, critical services that are intolerant to excessive restoration times or outages generate loss of revenue with an interruption of service or by not meeting service level agreement-based quality of service (QoS) requirements.

Fast Optical Layer Restoration

For the optical layer, a simple restoration strategy can be devised for physical ring network topologies. However, mesh networks promise efficient, flexible use of fiber capacity and are cost-effective. So, the challenge is to design a protection strategy in the optical domain that provides sub-second restoration times for carrier-scale mesh-based optical networks. A fast, scaleable restoration strategy for optical networks preferably includes (1) using a physical mesh topology with restoration capacity sharing for greatest planning flexibility and cost efficiency, (2) employing end-to-end path-based (versus local or link-based) restoration for better capacity utilization, (3) providing physically disjoint (node and trench) alternative routes, (4) pre-computing alternative paths to save restoration time, (5) performing fault detection (rather than fault isolation) at the destination endpoint and conveying a failure notification to the affected connection source, which then activates the alternative path, and (6) using a reliable data communications network (DCN) for inter-node signaling and messaging. More information on the above strategy can be found in Austin, G., et al., "Fast, Scaleable and Distributed Restoration in General Mesh Optical Networks," *Bell Labs Technical Journal*, 6 (1), Jan-Jun 2001, pp. 67-81 (herein "Austin '01"), incorporated herein by reference. More information on path-based versus link-based restoration strategies can be found in Anderson, J., et al., "Fast Restoration of ATM Networks," IEEE J. on Selected Areas in Comm., 12 (1), Jan 1994, pp. 128-138 (herein "Anderson '94"), incorporated herein by reference in its entirety.

For this six-part strategy to work, network elements are assumed to exchange state information and to have a view of substantially the entire network topology. Alternatively, a strategy where full network topology is not required is described in Doshi, B., et al., "Optical Network Design and Restoration," Bell Labs Technical Journal, 4(1), Jan-Mar 1999, pp. 58-84, incorporated herein by reference in its entirety.

Bottlenecks to Restoration Time Reduction

When a node or link failure in a network occurs, a particular subset of source-destination service demands gets disrupted, namely, those whose primary paths transit the fault. To set up the restoration paths, each node on the alternative paths for these demands (including the source and destination nodes) has to perform a certain number of cross-connections. With the availability of fast optical cross-connect devices (OXCs) that can execute hundreds of cross-connections in tens of milliseconds time, realistic-sized general shared-mesh networks with acceptable overall restoration times are within reach in the optical domain. However, there is a limit to the impact of these approaches because a critical bottleneck for restoration speedup is the number of cross-connections that must be performed at a single node. The greater the number of cross-connects, the greater the resulting restoration time. Embodiments of the present invention utilize one or more of the following methods to reduce the impact of the cross-connection bottleneck: (1) re-engineering of the traffic demand routes to minimize node cross-connect loads, (2) grouping or bundling of cross-connect request messages, and (3) selective introduction of higher rate transport.

Traffic Re-Engineering/Path Planning

Embodiments of the present invention may include a mechanism for reducing the time for the network to recover from any single failure scenario (e.g., the failure of any node or link in the network). Multiple failures that are restricted in scope to either one link or one node would still fall within the scope of a single failure for the purposes of this discussion. The cross-connection (XC) load at a node for a given failure is defined to be the number of XC requests to be processed by that node for that failure. The maximum XC load among all nodes across all possible failures provides an indication of the worst-case restoration time. Planning and engineering the network to reduce this maximum XC load will reduce the associated worst-case restoration time for the network.

One typical aspect of network design is determining where to cost-effectively install capacity in the network. This usually means finding primary and alternative routes for each service demand that yield a minimum total cost when all possible failure scenarios are considered and the additional conditions of the six-part fast restoration strategy (see Anderson '94) are taken into account. The additional conditions include capacity sharing among the alternative routes and physical disjointness of each demand's primary and alternative routes. The cost metric can be a capital expenditure cost, total cost of ownership (TCO), total cost of maintenance (TCM), total cost of operation (TCOP), or a cost surrogate such as total bandwidth or capacity-distance (e.g., fiber-kilometers). These costs are a function of how effective the capacity sharing is in reducing overall capacity required for restoration.

Minimize Cross-Connections Without Regard to Cost

Embodiments of the present invention may involve planning the primary and secondary demand routes in such a way as to minimize the worst-case restoration XC load without any regard to cost. Doing so gives the best improvement in restoration time achievable (assuming node cross-connections remain the limiting factor). Since cost is not the focus in these embodiments, the conditions to ensure and enhance capacity sharing can be ignored during the route planning.

One implementation involves an exhaustive analysis of all possible primary and restoration path plan alternatives under all possible failure scenarios. This is followed by a selection of the path plan that results in the smallest maximum number of cross-connections. FIG. 1 illustrates this implementation.

As shown, the process begins with the input of the network topology in step 100, followed by the input of the traffic demands matrix in step 102. Using this information, in step 104, a first primary/restoration path plan is selected that accommodates all the service traffic demands in the network. Next, in step 106, the variables BestPlanID and WorstCaseXC# are initialized to zero and infinity, respectively. Following this, in step 108, the selected plan is subjected to a failure analysis. For each single point network element failure, an analysis is performed to determine the number of cross-connections that needs to be performed at each node in the network to switch over to the restoration paths for the services affected by the failure. Next, in the test of step 110, if the number of cross-connections is less than the current value of WorstCaseXC#, then, in step 112, WorstCaseXC# is set equal to the worst-case number of cross-connections that was just calculated and BestPlanID is set equal to the plan ID for the current plan. Next, or if the test of step 110 failed, the test of step 114 is performed. If all the primary/restoration path plans have not already been considered, then a new primary/restoration path plan, unique from those previously considered, will be selected in step 116, and the procedure will continue with the analysis of this new plan in step 108 as previously described. After all of the primary/restoration path plans have been considered, the procedure exits in step 118.

Although the approach of this implementation would achieve the goal of minimizing restoration time, it is recognized that this approach, while feasible for small networks, becomes computationally difficult (NP-hard) for networks of practical size. The problem for a medium-sized network and with typical numbers of traffic demands can be large (e.g., a million variables). Therefore, in a preferred implementation, an approximation approach is used that is computationally tractable and can be shown to yield optimal or near optimal results.

The preferred approximation implementation involves a two-phase mathematical programming method. The first phase can be thought of as load balancing. A network flow-like problem is formulated that produces two node-disjoint paths between the source and destination nodes for each service demand in a network. The objective is to minimize the maximum total traffic (or alternative indicators of cross-connect load) required on each link in the network. (Alternatively or additionally, traffic (or alternative indicators of cross-connect load) required on nodes can be considered.) Traffic is a surrogate or estimate of the loading on a cross-connect in the network. Note that, in one or more embodiments, other estimates or surrogates could be alternatively minimized. This first phase considers potential pairs of disjoint paths for the service demands of the network and selects a set of path pairs that distributes the traffic as evenly as possible over the network so that the least possible number of XCs are required at any one node. The pairs are chosen such that the maximum link bandwidth in the network is minimized and the link bandwidths within the network are leveled. However, this approach does not identify which path is the primary path and which is the restoration path.

Since the set of restoration paths impacts the number of cross-connections performed at the nodes for each failure scenario, a judicious assignment of each demand's disjoint path pair as a primary path and a restoration path can reduce the worst-case restoration XC load. This is what the second optimization phase does.

The second phase involves identifying the primary and restoration paths for each service demand within the network such that the worst-case number of cross-connections at any node within the network is minimized across all possible single-event failures.

As part of the second phase, a mixed-integer program (MIP) is invoked that, given a set of disjoint path pairs (one for each demand), minimizes the maximum number of cross-connects at any node for any failure scenario subject to the condition that one path in each path pair is primary and the other is secondary (i.e., restoration). More information on commercial solvers and mixed-integer programming can be found in *Combinatorial Optimization,* Christos Papadimitriou and Ken Steiglitz, 1982, Prentice Hall; *Optimization Algorithms for Networks and Graphs,* James Evans & Edward Minieka, 1992, Dekker Publishing; and *Integer and Combinatorial Optimization,* George Nemhauser and Lawrence Wolsey, 1988, Wiley, each incorporated herein by reference in its entirety. Finally, once the restoration paths have been identified, they can be post-processed to determine the maximum number of cross-connections per node per failure scenario (and consequently the worst-case restoration time) as well as the restoration capacity required on any link in any failure scenario. The latter can be used to cost out the final design.

Figure 2:
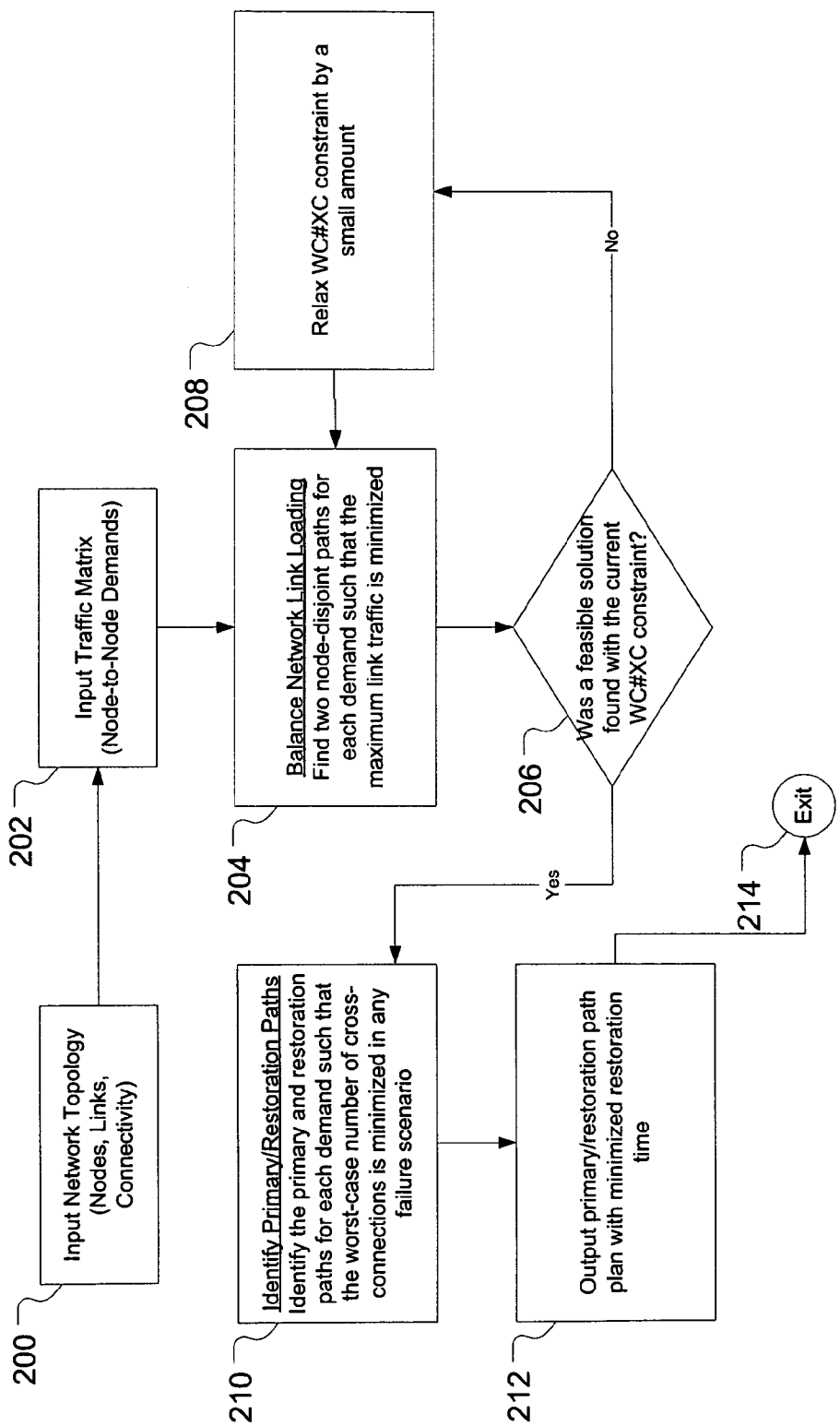
FIG. 2 illustrates an alternative method for minimizing the number of cross-connections within a network, which method involves a two-phase optimization.

FIG. 2 illustrates the two-phase optimization implementation approach of this embodiment. As illustrated, the process begins with the input of the network topology in step 200, followed by the input of the traffic demands matrix in step 202. Using this information, in step 204, the first phase of the optimization (the load-balancing phase) is executed using the initial problem formulation (as discussed in more detail with respect to FIG. 3 below), which includes a "worst-case number of cross-connections" constraint. In this phase, the objective of the optimization is to find two node-disjoint paths for each demand such that the maximum link traffic or estimated cross-connect load is minimized. In step 206, a test is performed to determine whether a feasible solution was found based on the current value of the worst-case number of cross-connections that was imposed in the initial formulation. If a feasible solution was not found, then, in step 208, the constraint is relaxed by some specified amount. If a feasible solution was found, then, in step 210, primary and restoration paths are found for each demand in the network such that the worst-case number of cross-connections is minimized in any failure scenario. Finally, in step 212, the primary/restoration path plan that resulted in the minimum number of required cross-connections across all possible failure scenarios (and consequently the minimum restoration time) is output, and the process exits in step 214. Alternatively, the phases can be integrated and/or iterated as would be understood to one skilled in the art; however, the preferred implementation described above provides improved convergence of the process.

Note that, in certain circumstances, it is of interest to minimize the restoration time of an established network whose service demands are operational and already mapped to primary and restoration paths. In these circumstances, there would be a certain impact of completely remapping (e.g., from scratch) the primary and restoration paths for these established services. Thus, certain embodiments of the present invention support the (1) incremental updating of an established path plan as new demands are added, and (2) optimization of only a subset of the network. These cases would be understood by one skilled in the art to be just special cases of the embodiments already discussed, where additional constraints are added to lock in the existing primary path assignment or alternatively assign a cost to the remapping of primary paths that drives the optimization away from costly (e.g., extensive) remapping. For example, in case (1) above, if a new demand is requested on an established network, the new demand is not initially constrained as to which primary and restoration path is assigned to it. However, the existing demands can be weighted with a very high cost associated with their primary paths being mapped anywhere but where they are currently mapped. This additional cost can be considered in the optimization as a constraint that would drive the optimization away from a solution that would involve a new path plan that would remap the existing services. However, the optimization would have flexibility with regard to where it mapped the new service demand. Similarly, in case (2), by adjusting the weights on individual demands, the optimization is given some freedom to remap some portions of the demands in the network. For example, by assigning lower weights to the remapping of demands that do not have guaranteed quality of service, the optimization can be tuned to arrive at a path plan whose implementation on an operation network would have minimum impact to the highest paying customers. The weights can be adjusted in other ways as well (e.g., to minimize administrative cost) as would be understood to one skilled in the art.

Each of the two phases of this implementation may be solved using a commercial mixed-integer program solver. The problem formulation for the integer solver programs is modeled as a network flow problem with additional constraints as would be understood to one skilled in the art.

Load-Balancing Stage Problem Formulation

Figure 3:
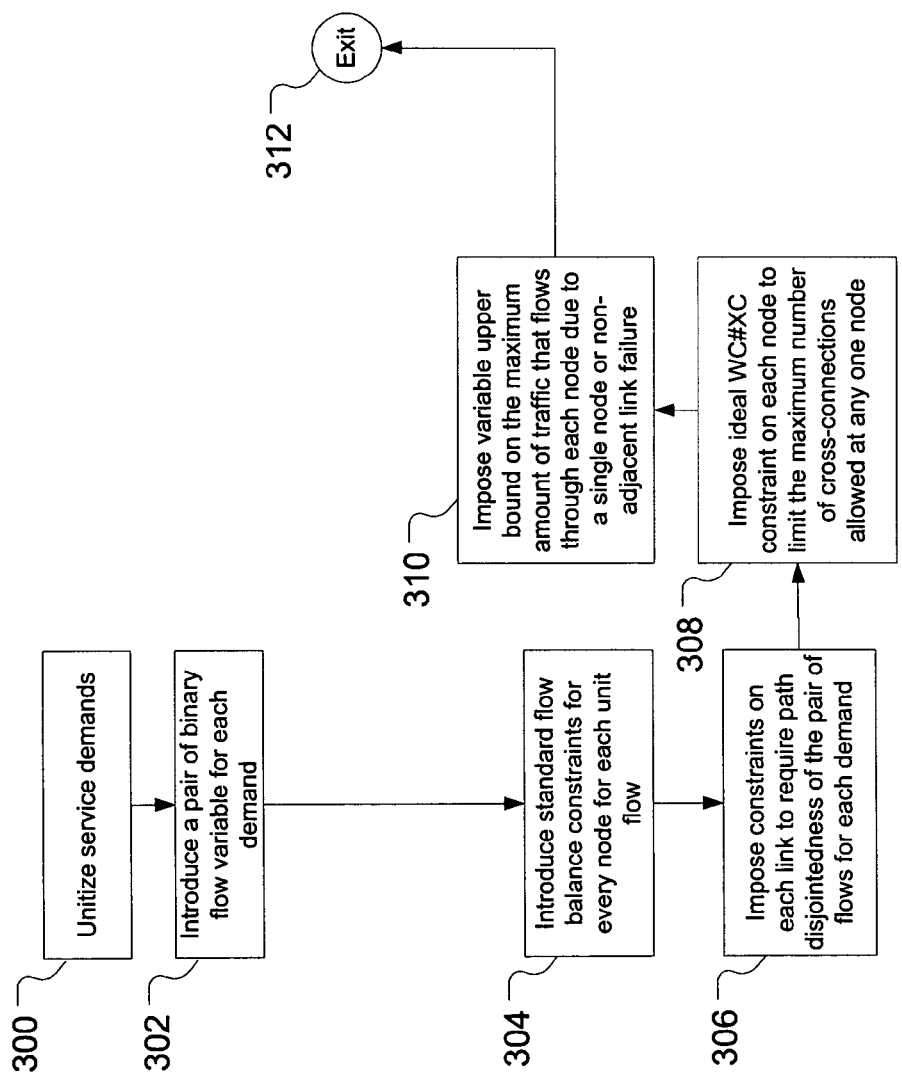
FIG. 3 illustrates an exemplary approach to formulating the load-balancing phase (step 204) of the method of FIG. 2.

The load-balancing stage (i.e., step 204 of FIG. 2) may be implemented using the problem formulation approach illustrated by FIG. 3. In step 300, each demand in the network is unitized. To do this, a fundamental bandwidth quantity for the network (e.g., OC-48) is selected, and each service bandwidth demand in the network is represented as an integer multiple of this fundamental bandwidth unit. Once the demands are unitized, in step 302, a pair of binary flow variables is introduced for each demand. Standard flow-balance constraints are introduced in step 304 for every node for each unit flow. Additionally, in step 306, constraints are imposed on each link to require node disjointedness of the pair of flows for each demand. Further, in step 308, a "worst-case cross-connection" (WC#XC) constraint is imposed on each node to limit the maximum number of cross-connections allowed at any one node for any adjacent-link failure. This maximum number is a parameter initialized to be the best possible value based on graph-theoretic considerations. One formulation of the WC#XC constraint is the "tent-pole" condition which specifies a lower bound on the worst-case number of cross-connections that is required in the network given a single adjacent-link failure:

$$WC\#XC \geq \max_{n \in N}\{\lceil \delta_n/d_n \rceil\}$$

where n, a node in the network, is an element of N, the set of all nodes in the network, $\delta_n$ is the number of unit demands terminated on node n, $d_n$ is the number of edges (graph-theoretic equivalent to links) incident on node n, $\lceil x \rceil$ is the ceiling function which rounds its input x up to the nearest integer, and the function "max" returns the maximum value of the elements in its input set (in this case, the ceiling function of the largest ratio of unit demands at a node to incident links at that node that exists in the network). Note that, it is not always possible to find a feasible solution that meets this lower bound. Thus, in certain implementations of the present invention, the variable constraint WC#XC is initialized to this theoretical best value and then iteratively "backed-off" until a feasible solution is found. This is illustrated by test 206 and step 208 of FIG. 2, where the worst-case number of cross-connections constraint is relaxed slightly each time the test fails to find a feasible solution. The final solution might not meet the optimal graph-theoretic constraint, but instead will be within a specified tolerance of the theoretical minimum. In step 310 of FIG. 3, constraints on each node are applied that impose a uniform variable upper bound on the maximum amount of traffic (or estimated cross-connect load) that flows through each node due to a single node or non-adjacent (e.g., not incident to the node under consideration) link failure. The objective of the load-balancing stage is to minimize this variable upper bound, thereby distributing traffic and, hence, cross-connect load as uniformly as possible across the network. Once the problem formulation is complete (step 312), it may be fed to a commercial solver program with the result being a traffic plan, with primary and restoration paths undifferentiated, that minimizes the maximum number of cross-connections.

Figure 4:
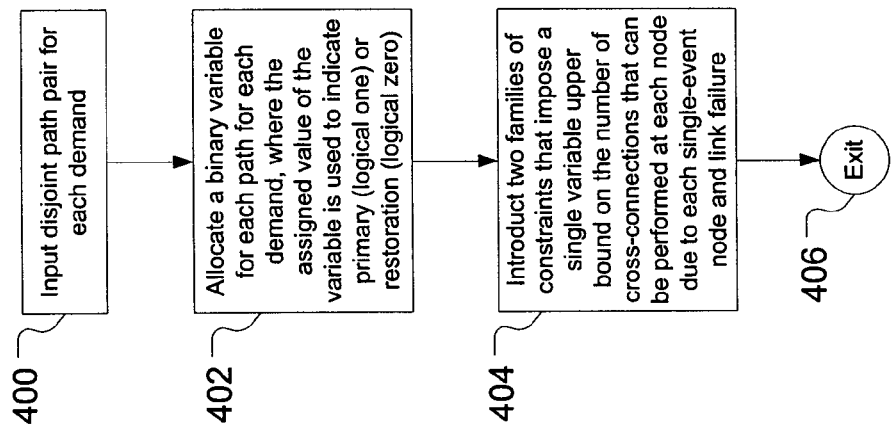
FIG. 4 illustrates an exemplary approach to formulating the path plan identification phase (step 210) of the method of FIG. 2.

The second stage of optimization is path identification. While the load-balancing phase produces two node-disjoint paths for each demand, it does not identify which path is the primary path and which is the restoration path. The goal of path identification is to identify from among the node-disjoint paths for each demand the primary and restoration paths such that the worst-case number of cross-connections is minimized in any failure scenario. The formulation is illustrated by the procedure of FIG. 4.

In step 400, the two paths found per demand from the load-balancing phase are input, and, in step 402, a binary variable is introduced for each demand that indicates which path is primary and which is restoration. Then, in step 404, two families of constraints are introduced that impose a single variable upper bound on the number of cross-connects that must be performed at each node due to each single-event node and link failure, and, in step 406, the formulation process exits. Since the candidate paths are known from load balancing, the exact number of cross-connections can be computed for each node in each failure scenario. The objective of path identification is to find the assignment of primary and restoration paths for each demand that minimizes this variable upper bound, i.e., that minimizes the worst-case number of cross-connections that would have to be performed in any failure scenario.

Cross-Connection Request-Bundling

Another approach to reducing network recovery time is to trim the amount of time an OXC spends processing multiple cross-connection requests. Bundling XC requests means that the overhead and certain messaging otherwise processed for each single request would now be processed only once per bundled request. This would reduce the total time required to complete multiple XCs at the node having the worst-case XC load, thereby reducing the network's maximum service restoration time. Request-bundling can be implemented in addition to, or instead of, traffic re-engineering.

There are several ways to implement XC request-bundling ranging from bundling strategies based on planning considerations and requiring minimal signaling support, to those based on no planning considerations but requiring more signaling support. Examples include demand-bundling, node-bundling, and path-bundling.

Demand-bundling groups demands with the same source-destination node pairs and then routes them all along the same pair of disjoint primary and restoration paths. While this allows signaling to be carried out jointly for the entire group, routing grouped demands is likely to be less cost-effective and also restrictive of traffic re-engineering options to minimize worst-case XC load. More information on demand-bundling can be found in Austin '01.

Node-bundling groups XC requests as they arrive at each node up to a time limit. This is probably the simplest to implement and seems to provide the fastest recovery times.

Path-bundling groups demands with the same restoration path in a failure scenario. Bundles are formed at the common source node as failure notices arrive from the destination.

A maximum bundle size is usually imposed in all these methods.

Traffic Aggregation

Traffic aggregation reduces the worst-case number of XCs in an optical network by reducing the maximum number of transport channels an OXC might have to switch in any failure scenario. This can be accomplished by selective introduction of higher rate channels in the network for certain demands or for certain links. This is referred to in the industry as "banding." For example, every four OC-192/STM-64 demands groomed into one protected OC-768/STM-256 trunk can reduce by a factor of 3 the worst-case number of XCs performed at a node. Since a bottleneck node has many XCs, there tends to be a synergy between XC reduction and aggregation into more cost-efficient transport.

Embodiments of this invention may involve implementations that pre-compute pathways or implementations where some or all of the computation or optimization of alternative routes is computed after the failure is detected and in some cases may involve fault isolation in the alternative route determination.

While this invention has been described with respect to restoration associated with situations involving single point failures, the concepts can be extended to multiple point failure situations, as would be understood to one skilled in the art.

Although the present invention has been described in the context of optical networks, the invention can also be implemented in the context of non-optical networks such as all electrical networks and hybrid optical/electrical networks.

Although the present invention has been described in the context of path-based restoration, the invention can also be implemented in the context of link-based restoration as would be understood to one skilled in the art.

Although the present invention has been described in the context of optimization using a commercial solver based on mixed-integer programming, there are other commercial solvers based on other techniques (e.g., genetic algorithms, simulated annealing, neural networks, and tabu search). As would be understood to one skilled in the art, the present invention can also be implemented using one or more of these alternative commercial solvers or a custom optimization program based on these alternative techniques.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A network-manager-implemented method, comprising:
   the network manager receiving one or more demands for service in a mesh network comprising a plurality of nodes interconnected by a plurality of links;
   the network manager specifying a threshold corresponding to a maximum number of failure-related cross-connections at a node in the network; and
   the network manager mapping each of the one or more demands onto a primary path and a restoration path in the network to generate a path plan for the one or more demands in the network, wherein:
   reduction of a portion of restoration time associated with failure-related cross-connections in the network is taken into account during the mapping;
   the mapping generates the path plan based on the specified threshold such that, for all nodes in the mesh network, the number of failure-related cross-connections at each node is no more than the specified threshold; and
   the mapping results in a maximum number of failure-related cross-connections at all nodes in the network being within a specified tolerance of a theoretical minimum.

2. The method of claim 1, wherein a graph-theoretic condition is used to derive the theoretical minimum.

3. The method of claim 2, wherein the theoretical minimum is defined by $\max_{n \in N}\{\lceil \delta_n/d_n \rceil\}$ where n, a node in the network, is an element of N, the set of all nodes in the network, $\delta_n$ is the number of unit demands terminated on node n, and $d_n$ is the number of edges incident on node n.

4. The method of claim 1, wherein the mapping sequentially evaluates each possible path plan for each of the one or more demands and selects the path plan having a smallest maximum number of failure-related cross-connections.

5. The method of claim 1, wherein the mapping comprises:
   selecting two node-disjoint paths for each demand, wherein leveling of link loads is taken into account during the selecting; and for each demand, identifying one of the two node-disjoint paths as the primary path and the other as the restoration path, wherein a maximum number of failure-related cross-connections at all nodes in the network is taken into account during the identifying.

6. The method of claim 5, wherein:
selecting the two node-disjoint paths for each demand minimizes maximum link bandwidth in the network; and
identifying the primary and restoration paths for each demand results in the maximum number of failure-related cross-connections at all nodes in the network being within the specified tolerance of the theoretical minimum.

7. The method of claim 6, wherein a tent pole condition is used to derive the theoretical minimum.

8. The method of claim 5, wherein the selecting of the two node-disjoint paths for each demand and the identifying, for each demand, of the one of the two node-disjoint paths as the primary path and the other as the restoration path are implemented using mixed-integer programming.

9. The method of claim 5, wherein the selecting of the two node-disjoint paths for each demand and the identifying, for each demand, of the one of the two node-disjoint paths as the primary path and the other as the restoration path are implemented using genetic programming.

10. The method of claim 5, wherein the selecting of the two node-disjoint paths for each demand and the identifying, for each demand, of the one of the two node-disjoint paths as the primary path and the other as the restoration path are implemented using a commercial solver.

11. The method of claim 1, wherein the mapping involves demand bundling, wherein demands having a common source node and a common destination node are grouped and routed along a single pair of disjoint primary and restoration paths and at least a portion of connection signaling for the group is carried out jointly.

12. The method of claim 1, wherein the mapping involves traffic aggregation, wherein multiple low-rate channels in the network are consolidated into a high-rate channel and rerouting of the high-rate channel requires fewer cross-connections than rerouting of the multiple low-rate channels.

13. A network manager for a mesh network comprising a plurality of nodes interconnected by a plurality of links, the network manager comprising:
means for receiving one or more demands for service in the network;
means for specifying a threshold corresponding to a maximum number of failure-related cross-connections at a node in the network; and
means for mapping each of the one or more demands onto a primary path and a restoration path in the network to generate a path plan for the one or more demands in the network, wherein:
reduction of a portion of restoration time associated with failure-related cross-connections in the network is taken into account during the mapping;
the means for mapping generates the path plan based on the specified threshold such that, for all nodes in the mesh network, the number of failure-related cross-connections at each node is no more than the specified threshold; and
the path plan results in a maximum number of failure-related cross-connections at all nodes in the network being within a specified tolerance of a theoretical minimum.

14. The network manager of claim 13, wherein a graph-theoretic condition is used to derive the theoretical minimum.

15. The network manager of claim 14, wherein the theoretical minimum is defined by: $\max_{n \in N}\{\lceil \delta_n/d_n \rceil\}$ where n, a node in the network, is an element of N, the set of all nodes in the network, $\delta_n$, is the number of unit demands terminated on node n, and $d_n$ is the number of edges incident on node n.

16. The network manager of claim 13, wherein the network manager comprises means for sequentially evaluating each possible path plan for each of the one or more demands and means for selecting the path plan having a smallest maximum number of failure-related cross-connections.

17. The network manager of claim 13, wherein the network manager comprises:
means for performing selection of two node-disjoint paths for each demand, wherein leveling of link loads is taken into account during the selection; and
means for identifying, for each demand, one of the two node-disjoint paths as the primary path and the other as the restoration path, wherein a maximum number of failure-related cross-connections at all nodes in the network is taken into account during the identifying.

18. The network manager of claim 17, wherein:
the means for performing the selection of the two node-disjoint paths for each demand minimizes maximum link bandwidth in the network; and
the means for identifying the primary and restoration paths for each demand results in the maximum number of failure-related cross-connections at all nodes in the network being within the specified tolerance of the theoretical minimum.

19. The network manager of claim 18, wherein a tent pole condition is used to derive the theoretical minimum.

20. The network manager of claim 17, wherein the means for performing the selection and the means for identifying the primary and restoration paths are implemented using mixed-integer programming.

21. The network manager of claim 17, wherein the means for performing the selection and the means for identifying the primary and restoration paths are implemented using genetic programming.

22. The network manager of claim 17, wherein the means for performing the selection and the means for identifying the primary and restoration paths are implemented using a commercial solver.

23. The network manager of claim 13, wherein the network manager comprises means for considering demand bundling in the generation of the path plan, wherein demands having a common source node and a common destination node are grouped and routed along a single pair of disjoint primary and restoration paths and at least a portion of connection signaling for the group is carried out jointly.

24. The network manager of claim 13, wherein the network manager comprises means for considering traffic aggregation in the generation of the path plan, wherein multiple low-rate channels in the network are consolidated into a high-rate channel and rerouting of the high-rate channel requires fewer cross-connections that rerouting of the multiple low-rate channels.

25. A network-manager-implemented method, comprising:
the network manager receiving one or more demands for service in a mesh network comprising a plurality of nodes interconnected by a plurality of links;
the network manager specifying a threshold corresponding to a maximum number of failure-related cross-connections at a node in the network; and the network manager mapping each of the one or more demands onto a primary path and a restoration path in the network to generate a path plan for the one or more demands in the network, wherein:

reduction of a portion of restoration time associated with failure-related cross-connections in the network is taken into account during the mapping;

the mapping generates the path plan based on the specified threshold such that, for all nodes in the mesh network, the number of failure-related cross-connections at each node is no more than the specified threshold; and the mapping sequentially evaluates each possible path plan for each of the one or more demands and selects the path plan having a smallest maximum number of failure-related cross-connections.

26. A network manager for a mesh network comprising a plurality of nodes interconnected by a plurality of links, the network manager comprising:

means for receiving one or more demands for service in the network;

means for specifying a threshold corresponding to a maximum number of failure-related cross-connections at a node in the network; and means for mapping each of the one or more demands onto a primary path and a restoration path in the network to generate a path plan for the one or more demands in the network, wherein:

reduction of a portion of restoration time associated with failure-related cross-connections in the network is taken into account during the mapping;

the means for mapping generates the path plan based on the specified threshold such that, for all nodes in the mesh network, the number of failure-related cross-connections at each node is no more than the specified threshold; and the network manager comprises means for sequentially evaluating each possible path plan for each of the one or more demands and means for selecting the path plan having a smallest maximum number of failure-related cross-connections.

* * * * *

UNITED STATES PATENT AND TRADEMARK OFFICE
CERTIFICATE OF CORRECTION

PATENT NO. : 7,646,706 B2 Page 1 of 1
APPLICATION NO. : 10/673056
DATED : January 12, 2010
INVENTOR(S) : Alfakih et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1805 days.

Signed and Sealed this

Twenty-eighth Day of December, 2010

David J. Kappos
*Director of the United States Patent and Trademark Office*